United States Patent
Otten (10) Patent No.: US 6,647,720 B2
(45) Date of Patent: Nov. 18, 2003

(54) HYDROSTATIC UNIT FOR A HYDRO-MECHANICAL TORQUE DIVISION TRANSMISSION

(75) Inventor: Uli Otten, Speyer (DE)

(73) Assignee: Deere & Company, Moline, IL (US)

( * ) Notice: Subject to any disclaimer, the term of this patent is extended or adjusted under 35 U.S.C. 154(b) by 151 days.

(21) Appl. No.: 09/934,274

(22) Filed: Aug. 21, 2001

(65) Prior Publication Data

US 2002/0035833 A1 Mar. 28, 2002

(30) Foreign Application Priority Data

Sep. 26, 2000 (DE) .......................... 100 47 402

(51) Int. Cl.⁷ .............................................. F16D 31/02
(52) U.S. Cl. .......................................... 60/454; 60/487
(58) Field of Search ...................... 60/454, 456, 487; 74/655, 661, 665 R, 670, 718, 720

(56) References Cited

U.S. PATENT DOCUMENTS

| 4,825,722 A | * | 5/1989 | Hagin et al. ............... 74/606 R |
| 5,542,307 A | * | 8/1996 | Hasegawa et al. ......... 74/15.63 |

FOREIGN PATENT DOCUMENTS

| DE | DT 1944070 | 8/1969 |
| DE | 29 04 572 | 2/1979 |
| DE | 36 24 989 | 7/1986 |
| DE | 40 10 919 | 4/1990 |
| DE | 40 21 686 | 7/1990 |
| DE | 43 11 083 | 4/1993 |
| DE | 197 27 360 | 6/1997 |
| DE | 197 34 825 | 8/1997 |
| DE | 198 03 510 | 1/1998 |
| EP | 0 465 752 | 3/1990 |
| WO | WO 98/49471 | 11/1998 |

* cited by examiner

Primary Examiner—Edward K. Look
Assistant Examiner—Michael Leslie (57) ABSTRACT

A hydrostatic unit for a hydro-mechanical torque division transmission for a work vehicle having a mounting frame (10, 12) in which the shafts (18, 20) of hydrostatic devices (22, 24) are arranged parallel to one another are supported by bearing units (14, 16, 42, 48). The mounting frame (10, 12), the hydrostatic units (22, 24), the input shaft (36), the output shafts (44, 50, 56, 64) and the bearing units (14, 16, 42, 48, 54) together form a functioning hydrostatic module which can be pre-assembled. By supporting an input shaft (36) of the hydrostatic unit on the mounting frame (10, 12) by a bearing unit (38) such that it can rotate and is connected to the shaft (18) of the pump (22), a hydrostatic unit is provided that can be used in many different transmission applications.

20 Claims, 7 Drawing Sheets

HYDROSTATIC UNIT FOR A HYDRO-MECHANICAL TORQUE DIVISION TRANSMISSION

BACKGROUND AND SUMMARY OF THE INVENTION

The invention concerns the hydrostatic unit for a hydro-mechanical torque division transmission for an agricultural or industrial utility vehicle, with a mounting frame in which the shafts arranged parallel to one another of at least two hydrostatic devices are supported by bearing units such that they can be rotated, and on which the adjusting devices of the hydrostatic devices are supported. The hydrostatic devices consist of a hydraulic motor and a variable-displacement pump, which are hydraulically connected.

The use of torque division transmissions is advantageous with stepless drive systems for utility vehicles, since they are able to meet the demanding requirements with regard to reasonable power loss. With torque division transmissions, a portion of the power of the internal combustion engine is passed through a stepless transmission branch and the other portion of the power is passed through a constant-speed mechanical transmission branch. After passing through the transmission branches, the two power flows are superimposed and combined once again, and then passed further via mechanical drive elements to the wheels.

The stepless transmission branch is normally implemented with a hydrostatic transmission, the hydrostatic devices of which are a variable-displacement hydraulic pump and a constant-displacement motor. In some cases, instead of the constant-displacement motor, a variable-displacement unit is used.

With most known hydro-mechanical torque division transmissions for utility vehicles, commercially available and mass-produced hydrostatic pumps and motors are used, with these being arranged such that their respective sides opposite to the shaft outlet are placed back-to-back, and normally being located inside a common housing together with an epicyclic gear-set (DE 40 21 686 A1). The epicyclic gear-set may consist of a planetary drum. This consists of a summation gearbox and a number of additional epicyclic gear-sets, which are activated one after the other, and the components of which for shifting between different transmission ratios can be linked together by clutches and brakes.

EP 0 465 752 A1 describes several stepless gear-changing mechanisms each with a hydrostatic transmission having a hydraulic pump and a hydraulic motor. The hydraulic motor and the variable-displacement pump are connected together via a hydraulic circuit. They may be installed separately from one another or in a common housing, and are flange-mounted on a transmission housing. Their two shafts are arranged parallel to one another, and extend into the transmission housing, where they are connected to a mechanical summation gearbox and a conventional speed-changing gearbox. For every gear-changing mechanism represented, a specifically adapted hydrostatic transmission is provided.

DE-A-36 24 989 describes a transmission with hydraulic and mechanical components for providing propulsion to vehicles, in which the hydrostatic devices are connected together rigidly as a pre-assemblable unit with a control and connection block. This pre-assemblable unit is disposed into a common housing with an epicyclic gear-set, various clutches and an intermediate shaft, the hydrostatic devices being disposed within the installation length of the epicyclic gear-set and axially parallel to it, with the intention of keeping size and noise level low.

In hydro-mechanical torque division transmissions, the hydrostatic components-the variable-displacement pump and the constant-displacement motor-account for a large portion of the value created. Generally, the gear-maker for torque division transmissions is not also a maker of hydrostatic components. In order for the total costs of a hydro-mechanical transmission to remain comparable with those of power-shift stepped drives or full-power stepped transmissions, the transmission manufacturer attempts to select hydrostatic units of as low a size as possible, which are thus of low power. As a result, however, it may become necessary to increase the number of components in the mechanical part of the transmission, which in turn leads to increased costs.

The arrangement and selection of the hydrostatic devices has to be matched to the mechanical branch in question (planetary drum). Here, it is of particular importance whether the torque division takes place at the beginning of the mechanical branch ("torque split") or at the end of the mechanical branch ("speed split") or whether the mechanical branch is located between the two hydrostatic devices ("compound"). Additionally, it would be desirable to isolate the oil circuit for the hydrostatic devices from the lubrication oil circuit, but this entails considerable design effort. Furthermore, noise insulation with respect to the transmission housing can be implemented only with difficulty and at major expense.

The task on which the invention is based may be considered to consist in creating a hydrostatic unit of the type described earlier in such a manner that the problems listed earlier are resolved. In particular, a hydrostatic unit is to be provided which is usable in multiple applications and can therefore be manufactured in large numbers at low cost. It should be possible to provide a specific hydraulic circuit only for the hydrostatic devices and to keep noise transfer to the transmission housing at a low level.

The hydrostatic unit in accordance with the invention contains a mounting frame, on which the shafts of at least two hydrostatic devices are supported by bearing units such that they can rotate. The hydraulic circuits are also attached to the mounting frame, including a yoke, hydraulic hoses, valves and so on, as are the adjusting devices for the hydrostatic devices. The hydrostatic devices to do not have to have a specific housing of their own. At least one hydrostatic device, in the form of an adjustable-displacement pump, is mounted on the mounting frame such that it can be swivelled, while another hydrostatic device, in the form of a constant-displacement motor, can be mounted rigidly on the mounting frame. In place of a constant-displacement motor, however, a variable-displacement motor can also be used, being mounted such that it is movable.

An input shaft of the hydrostatic unit is also supported on the mounting frame by at least one bearing unit, having a driver/driven connection with the variable-displacement pump. At least two output shafts arranged parallel to one another and supported by at least one bearing unit each on the mounting frame are provided. At least one output shaft is driven mechanically by the input shaft, either directly or indirectly (e.g. via a gear-set or a mating connection), and at least one other output shaft is driven hydraulically, either directly or indirectly (e.g. via a gear-set or a mating connection) by the variable-displacement pump.

The mounting frame thus serves for the attachment of the hydrostatic devices and to support the input shaft and the output shafts. Together with the hydrostatic devices, the related hydraulic circuits and adjusting units, as well as the input shaft, the output shafts and the bearing units, it forms an autonomously functioning hydrostatic sub-assembly which can be pre-assembled and which can be tested independently of other transmission units.

The arrangement of the input shaft, the constant-displacement motor shaft, the variable-displacement pump shaft and the output shafts on a mounting frame make it possible for a hydrostatic unit formed in accordance with the invention to be used in a multiplicity of applications as a transmission module in vehicle drive trains to create stepless hydro-mechanical torque division drive designs. The hydrostatic unit delivers hydrostatic or mechanical power at various output shafts, to be passed on to the mechanical transmission branch of the overall transmission system, in particular into a planetary drum. It also supplies mechanical power to be passed on to mechanical power-consuming components such as power take-off shafts, air pumps, oil pumps and generators. Evidently, with a universally usable hydrostatic unit it is not obligatory for all of the output shafts to be used in every application.

A specific transmission module embodied in accordance with the invention can be connected as required to all known types of planetary transmission structures, such as "torque split," "speed split" and "compound," without any need for fundamental design changes. As a result, a wide range of use for different applications in differing utility vehicles (construction machinery, tractors, self-propelled machinery such as agricultural harvesters and sprayers, as well as many others) can be guaranteed for a hydrostatic unit embodied in accordance with the invention. The wide variety of potential applications means that the hydrostatic unit can be produced in large numbers, and therefore at low cost.

It has proved to be particularly advantageous to equip the hydrostatic unit in accordance with the invention with relatively powerful hydrostatic units. This means that a specific type of hydrostatic module can be used in all models of a given range of transmission units, covering a wide power band. These large hydrostatic devices can run relatively slowly, and thus with high efficiency. In order to provide a transmission unit of low power, it is only necessary to arrange for a relatively low number of speed changes in the mechanical branch of the overall transmission system, which entails cost advantages. Transmissions of higher power can be implemented using the same type of hydrostatic module by providing additional speed changes in the mechanical transmission branch. For the provision of a large number of transmission variants, with differing power classes, the use of a hydrostatic unit in accordance with the invention gives significant cost advantages.

In the case of a transmission of modular design it is advantageous if the individual transmission components are arranged one behind the other, essentially in an axial direction. In this case it may be advantageous if at least one section of the transmission input shaft driven by a prime mover (internal combustion engine) passes through the mounting frame upon which the hydrostatic module is installed. The transmission input shaft can serve as the input shaft to the hydrostatic unit and can be supported by a bearing unit on the mounting frame. It can also be aligned with the input shaft of the hydrostatic unit and be connected to it such that they rotate together.

In addition to these embodiments, however, it may also be advantageous if the transmission input shaft extends freely through the mounting frame of the hydrostatic module, for example inside a hollow shaft, and if it first supplies its motive power to the mechanical branch of the overall transmission system. In this case, it is advantageous if the input shaft of the hydrostatic unit can be connected with an output shaft of the mechanical transmission branch, in particular the output shaft of a modular epicyclic gear-set. It can also be expedient to form the input shaft of the hydrostatic unit as a hollow shaft and to dispose it concentrically to a transmission input shaft running within this hollow shaft and driven by a motor.

With all transmission variants, the transmission input shaft can simultaneously be used to drive a power take-off shaft.

A preferred embodiment of the invention provides that the hydrostatic unit's input shaft supported on the mounting frame is linked by a set of gears with the shaft of the variable-displacement pump. The gear-set, which for example may consist of an input shaft gear and a variable-displacement pump gear, forms part of the pre-assemblable hydrostatic sub-assembly.

In order to ensure compact dimensions it is advantageous if at least one output shaft of the hydrostatic unit is formed as a hollow shaft. This hollow shaft may run, for example, coaxially with the input shaft and may rotate relative to it. It has hydrostatic power, which is passed to a planetary drum. The power can also been passed to a group transmission disposed downstream of the hydrostatic unit, if a purely hydrostatic stepless transmission is to be created.

It is advantageous if the input shaft and the output shafts are disposed parallel to the shafts of the hydrostatic devices. The connections (e.g. connecting flange or mating connections) of the input shafts on the one hand and the output shafts on the other may be at one end or at opposing ends of the hydrostatic unit. It is expedient if all output shafts emerge from the same side of the hydrostatic unit.

It may be advantageous to dispose one output shaft coaxially with the input shaft and to link both shafts together, such that they rotate together (for example, by means of a mating connection). Thereby, the mechanical power of the input shaft is used on the one hand for the hydrostatic unit and is passed on the other through the hydrostatic unit. The power passed through can, for example, be fed to a planetary drum and/or to other loads such as the drive for a power take-off shaft.

In accordance with a further preferred embodiment of the invention, the shaft of one hydrostatic device (constant-displacement motor or variable-displacement pump) is linked by means of a set of gears with an output shaft. The gear-set, which, for example, may consist of a gear mounted on the hydrostatic device shaft and a gear mounted on the output shaft, forms part of the pre-assemblable hydrostatic sub-assembly.

As an enhancement or alternative to the above, it is advantageous if at least one output shaft is disposed coaxially to the shaft of a hydrostatic device and connected with it such that they rotate together. It is thus, for example, possible for the hydrostatic power present at the hydrostatic motor shaft to be picked off directly at a shaft coaxial to this shaft and to be fed to a planetary drum. It is also possible for the shaft of a hydrostatic device in the form of a variable-displacement pump to be connected with a coaxial output shaft, such that the two shafts rotate together, to which shaft additional power-consuming components can be connected which have to be driven at a constant ratio to the speed of rotation of the combustion engine. These components may, for example, be transmission oil pumps, air pumps or electrical machinery such as generators. The output shaft linked with the variable-displacement pump may also drive a further hydrostatic variable-displacement pump, the variable oil volume of which is fed to a hydrostatic constant-displacement pump, which drives a steplessly adjustable front-wheel drive of the utility vehicle.

For simplicity of installation it is particularly advantageous to provide the input shaft and/or the output shafts with toothed mating connections to ensure that adjacent components of the drive train will rotate with them, by which positive engagement with corresponding shafts of the mechanical transmission branch, in particular of a planetary drum, can be established. The toothed mating connections (mating flanges) permit compensatory movements between the hydrostatic unit and the transmission components connected to it. When assembling the transmission it is sufficient to move the pre-assembled hydrostatic unit and a pre-assembled transmission component towards one another, until the corresponding mating connections join together, and then to make the transmission housing flange connections.

It is advantageous if the hydrostatic sub-assembly possesses one input shaft and up to four output shafts.

In a highly preferred embodiment of the invention, the mounting frame has at least one bearing sub-assembly and a bearing housing which can be attached to it. The shafts of the hydrostatic devices and, as appropriate, the input shaft and/or the output shafts are then supported both in the bearing sub-assembly and in the bearing housing. Thus the shafts are supported at two points and can receive high forces. This design measure assists in the formation of a hydrostatic subassembly which functions in a self-contained manner and can be inserted as a module into a transmission assembly.

It is advantageous to dispose at least one gear-set in a space between the bearing sub-assembly and the bearing housing, which gear-set connects the input shaft with the shaft of a hydrostatic device in the form of a variable-displacement pump to transfer torque from one to the other or connects at least one output shaft with the shaft of a hydrostatic device in the form of a hydraulic motor, to transfer torque from one to the other. In this layout, the shafts carrying the gear-sets are supported on either side of the gear concerned, guaranteeing stability of the assembly.

Furthermore it is expedient if the hydrostatic unit in accordance with the invention contains speed sensors by means of which the speed of rotation of the input shaft and/or the speed of rotation of at least one output shaft is detected either directly or through interposition of one or more gears. The sensors integrated into the hydrostatic subassembly supply speed figures which provide important correcting variables to a transmission controller for adjustment of the stepless overall transmission system.

The arrangement of the hydraulic components and of the input and output shafts on a mounting frame, which may also be in the form of a base plate or a transmission housing wall, permits a very simple design in order to dispose vibration components, which serve in particular for noise insulation. It is advantageous to provide a transmission housing for the hydrostatic unit in which the mounting frame is disposed in a manner such as to absorb vibrations. The mounting frame is supported on the transmission housing, for example, by three or four vibration absorbers distributed around the circumference. In addition, as appropriate a bearing unit of the input shaft and/or at least one bearing unit of an output shaft of the hydrostatic unit can be supported on the transmission housing in a manner such as to absorb vibrations. The transmission housing can be attachable to the chassis of the vehicle.

By means of this design measure the mounting frame together with the essential components of the hydrostatic subassembly (hydrostatic devices, input and output shafts, bearing units, gear-sets) is largely isolated from the vibrations of the transmission housing which is attached to the vehicle, resulting in an attenuation of structure-borne sound waves and noise reduction. The vibration absorbing elements are designed to minimise noise emissions from the hydrostatic subassembly. Suitable vibration insulation components are commercially available.

For a modular construction of the overall transmission system it is advantageous to install the mounting frame in a transmission housing which is essentially top-hat-shaped and open on one side. In this case the transmission input shaft is supported in the bottom flange of the top-hat-shaped transmission housing and the free ends of the output shafts are located at the open side.

It is also expedient to design the transmission housing in such a way that when the overall transmission system is assembled, its inside volume is sealed off, for example by the flange of an adjacent planetary drum transmission housing. This makes it possible for a hydraulic circuit specific to the components disposed inside the transmission housing to be implemented.

The hydrostatic unit formed as a functioning module advantageously also contains its own hydraulic supply, with oil pump, fluid filter and cooler as necessary, through which the fluid from the bottom of the transmission is returned through filters. The components of the hydraulic supply may be attached to the mounting frame and/or to the transmission housing or be integrated in the latter. They serve to maintain a fluid circuit within the transmission housing, to charge the hydrostatic device's low-pressure circuit, in particular to compensate for leakage losses, and to supply lubricant to the bearing units of the hydrostatic unit. This results in a viable transmission module, which can be tested independently of other components. A type of fluid optimised for the hydrostatic unit can be used in this hydraulic circuit.

It is also advantageous if at least one hydraulic hose connecting the hydrostatic devices is supported in a crank-like shape on the mounting frame and contains a rotary pass-through. Such hydraulic hoses form a swivelling yoke assembly in a known manner.

The hydrostatic unit also contains at least one adjusting device, for example an electric motor, by means of which an adjustable hydrostatic device can be swivelled around its swivelling axis in order to adjust the pivoting angle.

Making use of the drawing, which shows several sample embodiments of the invention, in the following the invention and further advantages and advantageous enhancements and embodiments of the invention will be described and explained in greater detail.

DETAILED DESCRIPTION OF THE PREFERRED EMBODIMENT

Figure 1:
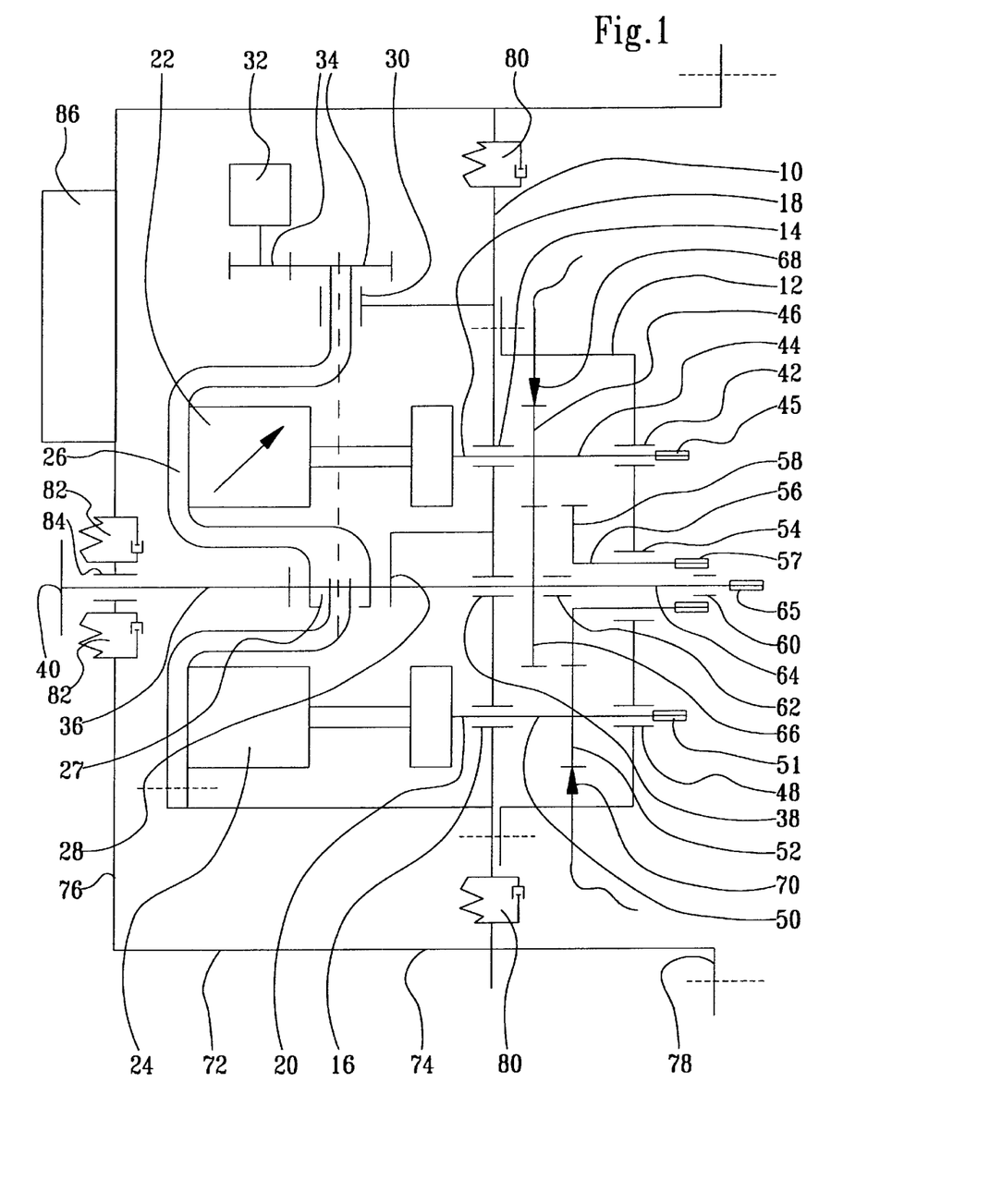
FIG. 1 Schematic representation of a first hydrostatic unit in accordance with the invention.

The hydrostatic unit represented in FIG. 1 contains a two-part mounting frame which essentially consists of a bearing sub-assembly 10 and a bearing housing 12 flanged to it. Even if the bearing sub-assembly 10 and the bearing housing 12 are essentially represented only as lines, in fact these are complex components, the actual design of which lies within the usual knowledge of a transmission designer. In a space between the bearing sub-assembly and the bearing housing 12, the gear-sets are disposed which will be described in greater detail later.

By means of one bearing unit 14, 16 each, the shafts 18, 20 of two hydrostatic devices 22, 24 are supported in the bearing sub-assembly 10. The hydrostatic devices consist of a variable-displacement pump 22 and a constant displacement motor 24. The two hydrostatic devices 22, 24 communicate with one another in the normal manner by hydraulic hoses 26 formed in a crank shape and able to swivel relative to one another, which are connected by means of a rotary pass-through 27 and supported by means of supporting points 28, 30 on the bearing sub-assembly 10, such that they can rotate. An electric motor 32 serves to swivel the variable displacement pump 22, the output shaft of the motor acting on the swivellable part of the hydraulic hose 26 by way of a gear-set 34. A hydrostatic adjusting unit, not shown, can also be used for swivelling purposes.

Figure 4:
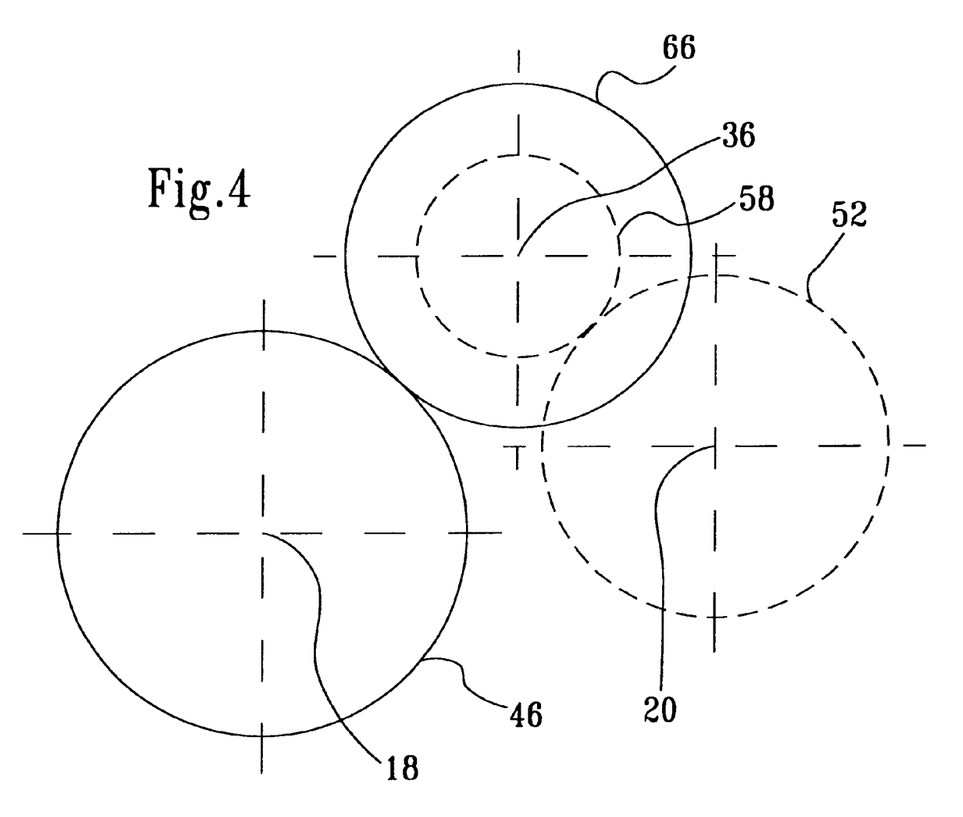
FIG. 4 Schematic representation of the relative position of the shaft axes.

An input shaft 36 is supported by means of a bearing unit 38 on the bearing sub-assembly 10. The input shaft 36 can be connected by means of a flange 40 on the drive side with a prime mover, not shown, or with components on the input side of the drive train. The shafts 18, 20 of the hydrostatic devices 22, 24 and the input shaft 36 are parallel to one another. The relative position of the axes of the shafts to one another can be seen in FIG. 4.

A first bearing unit 42 of the bearing housing 12 supports a mechanical output shaft 44 such that it can rotate. This output shaft 44 may be the variable-displacement pump shaft 18. The output shaft 44 can, however, also be a shaft aligned with the variable-displacement pump shaft 18 and positively connected with it by a mating flange, not shown. The output shaft 44 carries a pump gear 46.

A second bearing unit 48 of the bearing housing 12 supports a hydraulic output shaft 50 such that it can rotate. This output shaft 50 may be the constant-displacement motor shaft 20. The output shaft 50, however, may also be a shaft aligned with the constant-displacement motor shaft 20 and positively connected with it by means of a mating flange, not shown. The output shaft 50 carries a motor gear 52.

A third bearing unit 54 of the bearing housing 12 supports a hydraulic output shaft 56 in the form of a hollow shaft such that it can rotate. This hollow output shaft 56 carries an output gear 58, which meshes with the motor gear 52, forming an output gear-set together with it.

Within the hollow output shaft 56 a mechanical output shaft 64 is supported such that it can rotate by means of two bearing units 60, 62. This output shaft 64 may be an extension of the input shaft 36. The output shaft 64, however, may also be a shaft aligned with the input shaft 36 and positively connected with it by a mating flange, not shown. The input shaft 36 carries an input gear 66, which meshes with the pump gear 46 and forms an input gear-set with it.

The free ends of the two mechanical output shafts 44, 64 and of the two hydraulic output shafts 50, 56 have toothed mating connections 45, 65, 51, 57, through which connections with shafts of a mechanical transmission module, not shown, can be established.

Speed sensors 68, 70 are indicated, which in the normal manner detect the speeds of rotation of the pump gear 46 and of the motor gear 52 and pass corresponding signals to a transmission control unit, not shown. From the speed values detected, making allowance for the ratios of the gear-sets 46, 66 and 52, 58, the speeds of the input shaft 36 and the output shafts 56, 64 can also be calculated.

The described constructional elements are located in a transmission housing 72 of cylindrical shape, which has a cylindrical outer casing 74, a bottom flange 76 and an annular flange 78. The bearing subassembly assembly 10 is supported by means of three vibration damping elements 80 distributed equally around the circumference, of which two are shown, on the outer casing 74. A bearing unit 84 for the input shaft 36 is supported by additional vibration absorbing elements 82 at an orifice in the bottom flange 76. The vibration absorbing elements are commercially available components.

A valve housing 86 is attached to the outer side of the bottom flange 76, and this contains the entire oil management system, including oil filters, of the vehicle, which is otherwise not shown.

The flow of power through the hydrostatic unit shown in FIG. 1 is as follows:

The prime mover, not shown, of the vehicle drives the input shaft 36 via the flange 40, which input shaft delivers a mechanical portion of the power directly to the output shaft 64. A further mechanical portion of the power is delivered via the input gear-sets 66, 46 to the adjustable-displacement pump 22 on the one hand and to the output shaft 44 on the other. The constant-displacement motor 24 hydraulically driven by the variable-displacement pump 22 delivers a hydraulic portion of the power via its shaft 20 to the output shaft 50. In addition, the constant-displacement motor shaft 20 delivers a hydraulic portion of the power via the output gear-set 52, 58 to the hollow output shaft 56.

Figure 2:
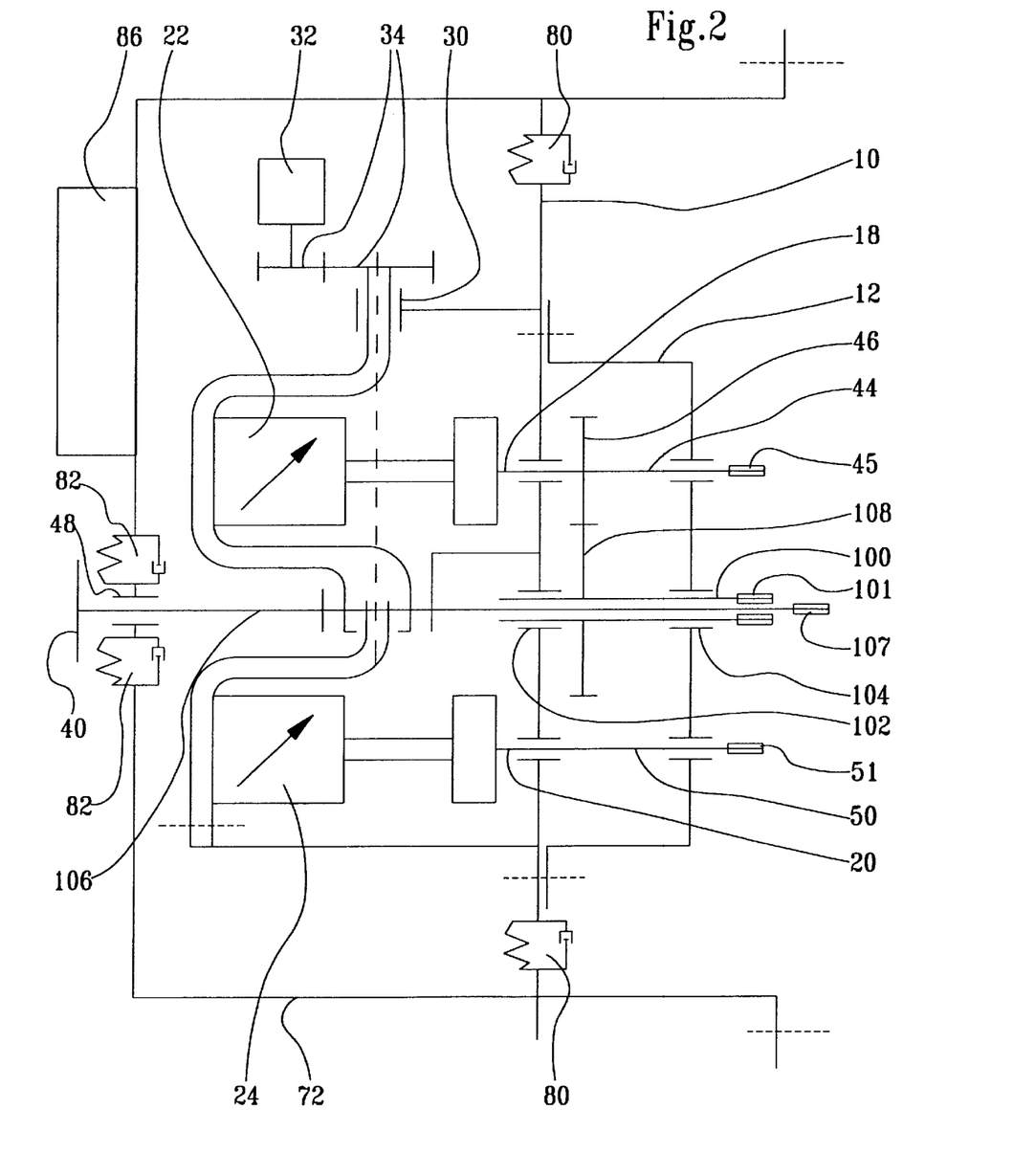
FIG. 2 Schematic representation of a second hydrostatic unit in accordance with the invention.
Figure 3:
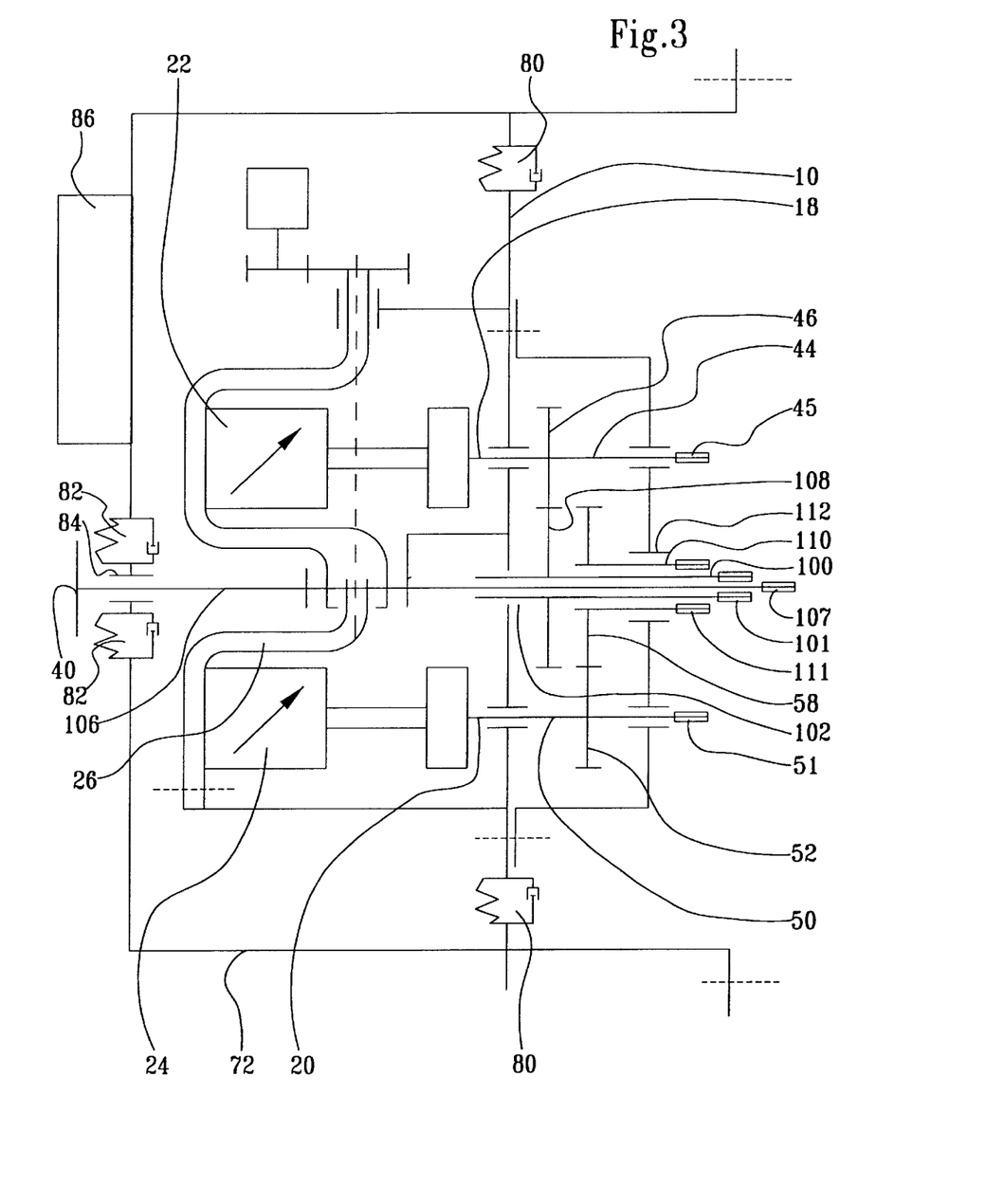
FIG. 3 Schematic representation of a third hydrostatic unit in accordance with the invention.

The hydrostatic units shown in FIGS. 2 and 3 are similar in many details to the hydrostatic unit shown in FIG. 1. In consequence, identical or 12 similar components are marked with the same reference numbers. Here, however, the hydrostatic motor 24 is not a constant-displacement motor as in FIG. 1, but a variable-displacement motor.

In the hydrostatic unit shown in FIG. 2, the input shaft 100 is in the form of a hollow shaft, which is supported by the bearing unit 102 on the bearing sub-assembly 10 and by the bearing unit 104 on the bearing housing 12, and is driven by a mechanical transmission module, not shown. The transmission input shaft 106 runs through the hydrostatic unit and, by contrast to the input shaft 36 shown in FIG. 1, does not deliver power to the hydrostatic unit. The transmission input shaft 106 runs concentrically within the hollow input shaft 100. The hollow input shaft 100 carries an input gear 108, such that they rotate together, which meshes with the pump gear 46 and forms an input gear-set.

The free ends of the transmission input shaft 106, the hollow input shaft 100, the mechanical output shaft 44 and the hydraulic output shaft 50 have mating connections 107, 101, 45, 51, by means of which connections with shafts of a mechanical transmission branch, not shown, can be established.

The flow of power through the hydrostatic unit shown in FIG. 2 is as follows:

The prime mover, not shown, of the vehicle drives the transmission input shaft 106 via flange 40, which input shaft runs through the hydrostatic unit without power division and delivers power via the mating connection 107 to a mechanical transmission branch, not shown. One shaft of the mechanical transmission branch is connected to the input shaft 100 via the mating connection 101 and delivers power via the input gear-set 108, 46 to the variable-displacement pump 22 on the one hand and to the output shaft 44 on the other. The constant-displacement motor 24, hydraulically driven by the variable-displacement pump 22, delivers hydraulic power via its shaft 20 to the output shaft 50 and via the mating connection 51 to the mechanical transmission module, not shown.

In the hydrostatic unit shown in FIG. 3 the transmission input shaft 106 and the hollow input shaft 100 are formed in a similar manner as in FIG. 2 and are concentric with one another. One end of the hollow input shaft 100 driven by a mechanical transmission branch is supported by a bearing unit 102 on the bearing sub-assembly 10. The hollow input shaft 100 runs, as shown in FIG. 3, within a hollow hydraulic output shaft 110, which is supported on the bearing housing 12 by means of a bearing unit 112 such that it can rotate. The hollow input shaft 100 carries an input gear 108 such that it rotates together with it, which meshes with the pump gear 46 and forms an input gear-set. The motor shaft 20 carries a motor gear 52 which meshes with an output gear 58 of the hollow hydraulic output shaft and forms an output gear-set.

The free ends of the transmission input shaft 106, the hollow input shaft 100, the mechanical output shaft 44 and the two hydraulic output shafts 50, 110 have toothed mating connections 107, 101, 45, 51, by means of which connections with shafts of a mechanical transmission branch, not shown, can be established.

The flow of power through the hydrostatic unit shown in FIG. 3 is as follows:

The prime mover, not shown, of the vehicle drives the transmission input shaft 106 via flange 40, which input shaft runs through the hydrostatic unit without power division and delivers power to a mechanical transmission branch, not shown. One shaft of the mechanical transmission branch is connected to the input shaft 100 via the mating connection 101 and delivers mechanical power via the input gear-set 108, 46 to the variable-displacement pump 22 on the one hand and to the output shaft 44 on the other. The constant-displacement motor 24, hydraulically driven by the variable-displacement pump 22, delivers hydraulic power via its shaft 20 to the output shaft 50 and via the output gear-set 52 to the hollow output shaft 110.

Figure 5:
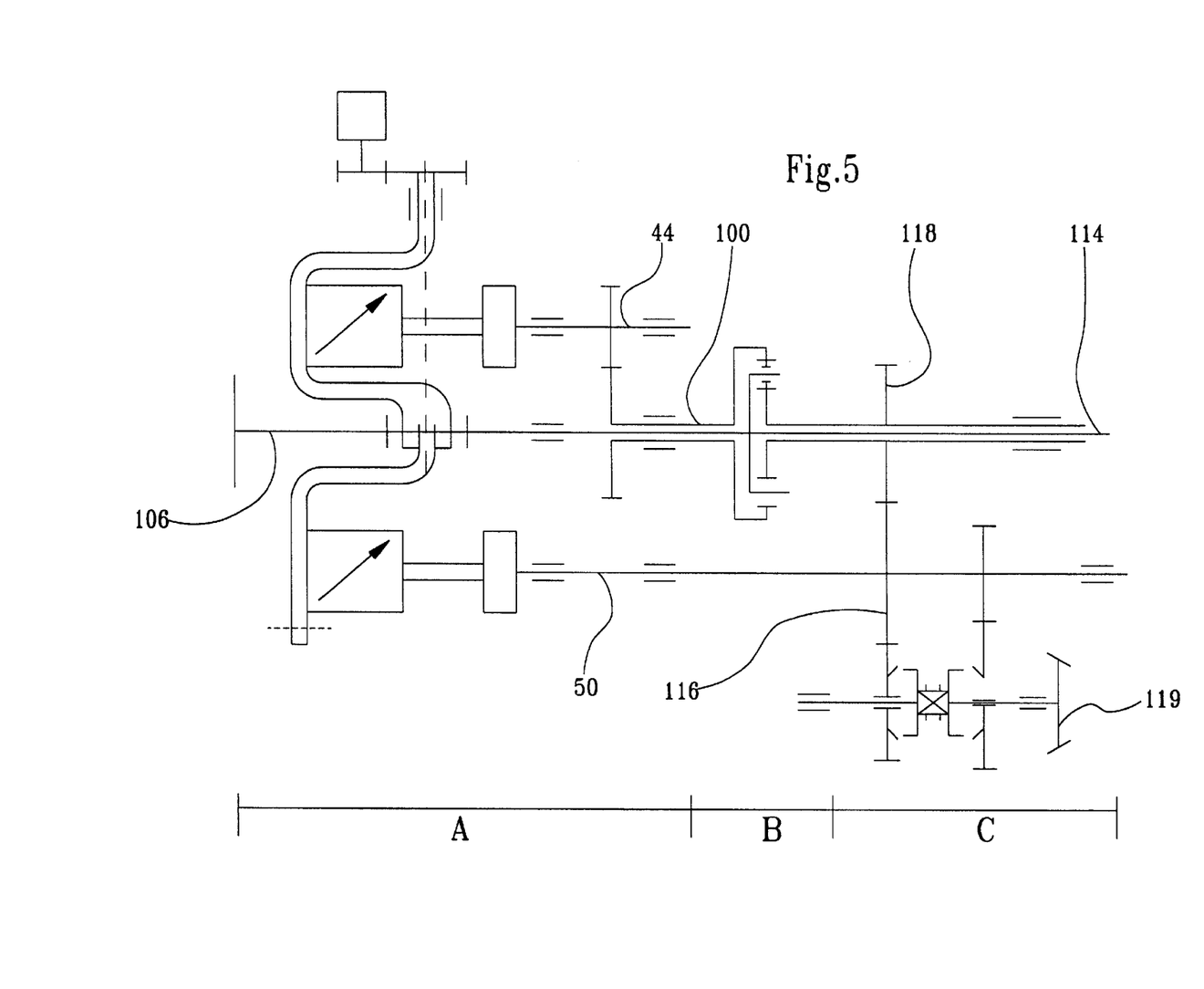
FIGS. 5 to 7 Three schematic representations of different hydro-mechanical torque division transmissions each with a hydrostatic unit in accordance with the invention.

FIG. 5 shows a so-called "speed split" transmission, which incorporates a hydrostatic unit A formed in accordance with FIG. 2, a planetary summation gearbox B, which is known, and a transfer box C, which is known. The transmission input shaft 106 running through the hydrostatic unit A and through the planetary summation gearbox B drives the planetary summation gearbox B and via output 114 also drives a power take-off shaft, not shown. The planetary summation gearbox B delivers mechanical power via the hollow input shaft 100 to the hydrostatic unit A. The hydraulic output shaft 50 of the hydrostatic unit A is connected with a gear 116, which meshes with an output gear 118 of the planetary summation gearbox and adds together the mechanical and the hydraulic portions of the power. By means of the transfer box C, it is possible to change between two sets in the normal manner. The total power of the transmission is delivered via the bevel gear 119 to a differential transmission, not shown. The mechanical output shaft 44 of the hydrostatic unit A is free in accordance with FIG. 5. By means of this shaft a power-consuming component, not shown, of the vehicle, such as a transmission oil pump, can be driven.

Figure 6:
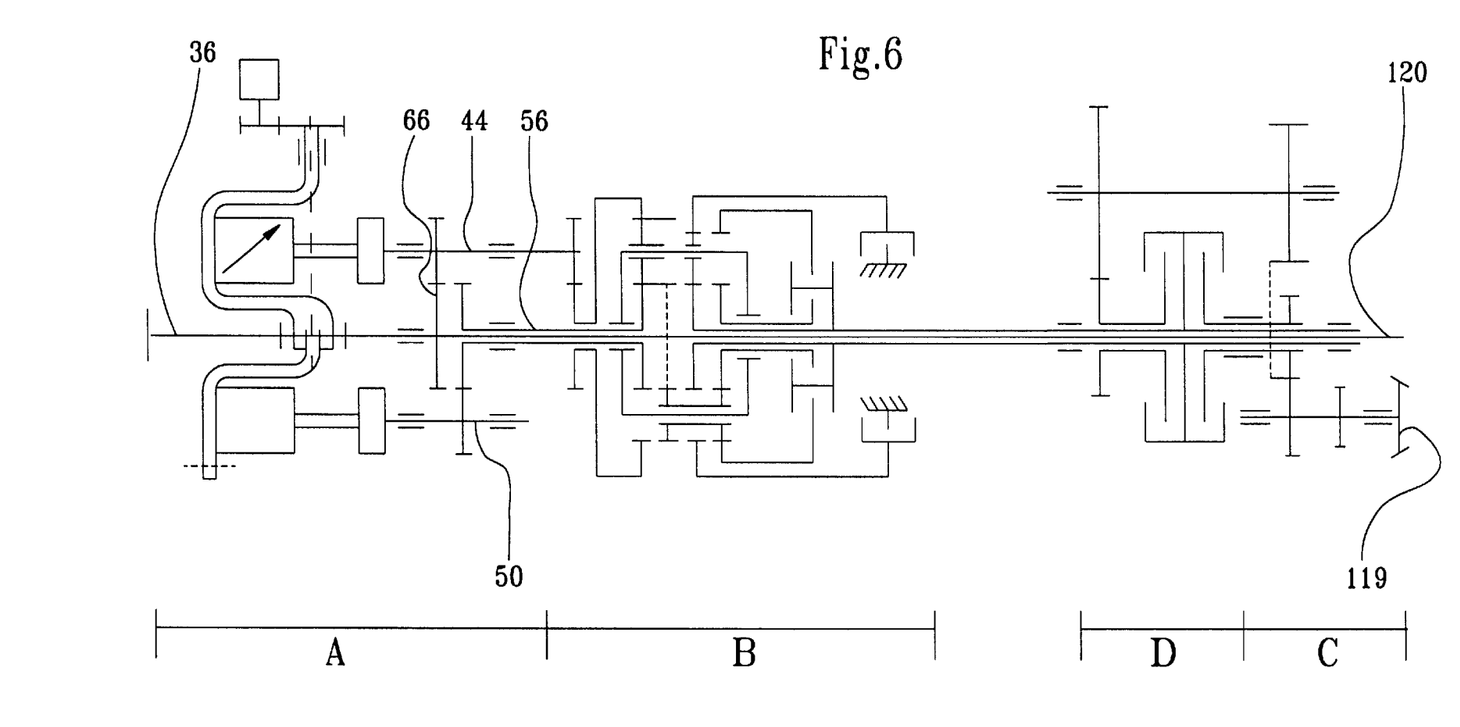

FIG. 6 shows a so-called "torque split" transmission, which incorporates a hydrostatic unit A formed in accordance with FIG. 1, a planetary drum B, a reversing gearbox D, which is known, and a transfer box C, which is known. The input shaft 36 running through the hydrostatic unit A and through the planetary drum B drives the input gear 66 of the hydrostatic unit A and via the hollow output shaft 120 also drives a power take-off shaft, not shown. The hydrostatic unit A delivers mechanical power via the output shaft 44 and hydraulic power via the hollow output shaft 56 to the planetary drum B, which adds together the portions of the power in the usual manner and permits changing between different operating ranges. By means of the downstream reversing gearbox D it is possible to change between forwards and reverse travel. By means of the transfer box C, it is possible to change between two sets in the normal manner. The mechanical output shaft 50 of the hydrostatic unit A is free in accordance with FIG. 6.

Figure 7:
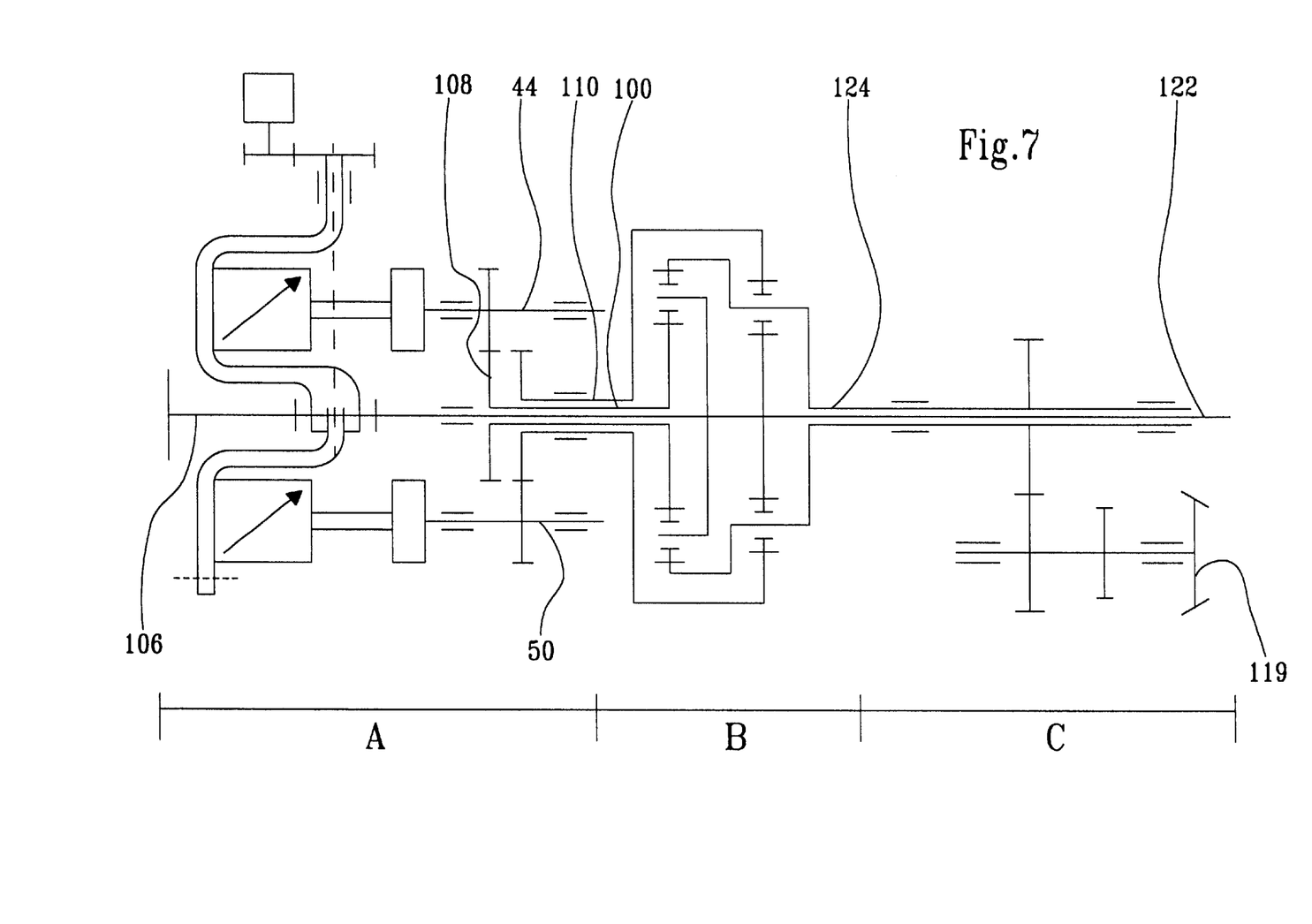

FIG. 7 shows a so-called "compound" transmission, which incorporates a hydrostatic unit A formed in accordance with FIG. 3, a planetary summation gearbox B, which is known, and a transfer box C, which is known. The transmission input shaft 106 running through the hydrostatic unit A and through the planetary summation gearbox B drives the planetary summation gearbox B and via output 122 also drives a power take-off shaft, not shown. The planetary summation gearbox B delivers mechanical power via the hollow input shaft 100 to the hydrostatic unit A. The hollow output shaft 110 of the hydrostatic unit A acts as the hydraulic input shaft to the planetary summation gearbox B, in which the mechanical and the hydraulic portions of the power are added together. The planetary summation gearbox B delivers its output power via the hollow output shaft 124 to the transfer box C, which can change between two sets in the normal manner. The mechanical output shaft 44 and the hydraulic output shaft 50 of the hydrostatic unit A are free in accordance with FIG. 7. By means of this shaft a power-consuming component, not shown, of the vehicle can be driven if required.

The variants of the hydrostatic unit shown in FIGS. 1 to 3 demonstrate only slight differences. It is possible by means of simple measures to convert from one variant to another. For this purpose, it is only necessary to detach the bearing housing 12 together with the related shafts and gear-sets and to install different shafts and gear-sets as appropriate.

Although the invention has been described only on the basis of a few sample embodiments, the preceding description and drawings will open up to the person skilled in the art numerous and various alternatives, modifications and variants falling under this invention.

What is claimed is:

1. A hydrostatic unit for a hydro-mechanical torque division transmission for a work vehicle, with a mounting frame (10, 12) in which shafts (18, 20) of at least two hydrostatic devices (22, 24) are arranged parallel to one another and are supported by bearing units (14, 16, 42, 48) such that they can rotate, and on which adjusting devices of the hydrostatic devices (22, 24) are supported, the hydrostatic devices being in the form of a variable-displacement pump (22) and a hydraulic motor (24) and being hydraulically connected, wherein an input shaft (36, 100) of the hydrostatic unit is supported on the mounting frame (10, 12) by at least one bearing unit (38, 102, 104) such that it can rotate and is connected to the shaft (18) of the variable-displacement pump (22) via a gear-set (66, 46; 108, 46), at least two output shafts (44, 50, 56, 64, 110) are arranged parallel to one another and are supported on the mounting frame (10, 12) by at least one bearing unit (42, 48, 54, 112), at least one of the output shafts (44, 64) is driven mechanically and at least one of the output shafts (50, 56, 110) is driven hydraulically and the mounting frame (10, 12), the hydrostatic devices (22, 24), the input shaft (36, 100), the output shafts (44, 50, 56, 64, 110) and the bearing units (14, 16, 38, 42, 48, 54, 102, 104, 112) together form a functioning hydrostatic sub-assembly that can be pre-assembled.

2. The hydrostatic unit of claim 1 wherein a transmission input shaft (106) driven by a prime mover extends through the mounting frame (10, 12).

3. The hydrostatic unit of claim 1 wherein the input shaft (36) of the hydrostatic unit is a transmission input shaft driven by a prime mover or is aligned with the transmission input shaft and connected with it such that they rotate together.

4. The hydrostatic unit of claim 1 wherein the input shaft (100) of the hydrostatic unit can be connected with an output shaft of a separate epicyclic transmission unit.

5. The hydrostatic unit of claim 1 wherein the input shaft of the hydrostatic unit is formed as a hollow shaft (100) and runs concentrically to a transmission input shaft (106) running inside the hollow shaft (100) and driven by a prime mover.

6. The hydrostatic unit of claim 1 wherein at least one output shaft is formed as a hollow shaft (56, 110).

7. The hydrostatic unit of claim 1 wherein the input shaft (36, 100) and the output shafts (44, 50, 56, 64, 110) are arranged parallel to the shafts (18, 20) of the hydrostatic devices (22, 24) and wherein the output shafts (44, 50, 56, 64, 110) emerge at one side of the hydrostatic unit.

8. The hydrostatic unit of claim 1 wherein at least one output shaft (64) is disposed coaxially to the input shaft (36) and is connected with it such that they rotate together.

9. The hydrostatic unit of claim 1 wherein one output shaft (56, 110) is disposed coaxially to the input shaft (36, 100) and can rotate with respect to it.

10. The hydrostatic unit of claim 1 wherein the shaft (20) of the hydrostatic unit (22, 24) is connected with a hydraulic output shaft (56, 110) via a gear-set (52, 58).

11. The hydrostatic unit of claim 1 wherein at least one output shaft (44, 50) is disposed coaxially to the shaft (18, 20) of the hydrostatic device (22, 24) and is connected with it such that they rotate together.

12. The hydrostatic unit of claim 1 wherein the input shafts (100) and/or at least one of the output shaft (44, 50, 56, 64, 110) have toothed mating connections (45, 51, 57, 65, 111) in order to establish connections with adjacent components of the drive train such that they will rotate together.

13. The hydrostatic unit of claim 1 wherein the mounting frame has at least one bearing sub-assembly (10) and one bearing housing (12) which can be attached to it and wherein the shafts (18, 20) of the hydrostatic units (22, 24), the input shaft (36, 100) and at least one output shaft (44, 50) are supported both in the bearing sub-assembly (10) and in the bearing housing (12).

14. The hydrostatic unit of claim 13 wherein in a space between the bearing sub-assembly (10) and the bearing housing (12) at least one gear-set (66, 46; 108, 46) is disposed which connects the input shaft (36, 100) with the shaft (18) of a hydrostatic device in the form of a variable-displacement pump (22) to transfer torque from one to the other.

15. The hydrostatic unit of claim 13 wherein in a space between the bearing sub-assembly (10) and the bearing housing (12) at least one gear-set (58, 52) is disposed which connects at least one output shaft (56, 110) with the shaft (20) of a hydrostatic device in the form of a hydraulic motor (24) to transfer torque from one to the other.

16. The hydrostatic unit of claim 1 wherein speed sensors (68, 70) are provided for direct or indirect detection of the speeds of rotation of the input shaft (36, 100) and/or of at least one output shaft (44, 50, 56, 110).

17. The hydrostatic unit of claim 1 wherein a transmission housing (72) is provided in which the mounting frame (10, 12) is disposed in such a manner as to absorb vibrations.

18. The hydrostatic unit of claim 1 wherein the mounting frame (10, 12) is installed in a transmission housing (72) which is essentially top-hat-shaped and open on one side, the transmission input shaft (36, 106) being supported in the bottom flange (76) of the top-hat-shaped transmission housing (72) and output shafts (44, 50, 56, 64, 110) having free ends (45, 51, 56, 65, 111) at the open side.

19. The hydrostatic unit of claim 1 further comprising a transmission housing (72) in which the mounting frame (10, 12) is disposed and a hydraulic supply with pump, fluid filter and cooler to maintain a fluid circuit in the transmission housing.

20. The hydrostatic unit of claim 1 wherein at least one hydraulic hose (26) connecting the hydrostatic devices (22, 24) is supported in a crank-like shape on the mounting frame (10, 12) and contains a rotary pass-through (27).

* * * * *